May 7, 1963   R. A. RIGHTMIRE ET AL   3,088,990
ENERGY CONVERSION SYSTEM
Filed April 25, 1960

INVENTORS
ROBERT A. RIGHTMIRE AND
JAMES L. CALLAHAN
BY
Kramer & Sturges
ATTORNEYS

United States Patent Office 3,088,990
Patented May 7, 1963

3,088,990
ENERGY CONVERSION SYSTEM
Robert A. Rightmire, Twinsburg, and James L. Callahan, Bedford, Ohio, assignors to The Standard Oil Company, Cleveland, Ohio, a corporation of Ohio
Filed Apr. 25, 1960, Ser. No. 24,406
4 Claims. (Cl. 136—86)

This invention relates to a system for the conversion of thermal energy through the vehicle of chemical analysis and synthesis to yield electrical energy.

Heretofore, the conversion of thermal energy to electrical energy has depended upon the vaporization of water to form steam, conversion of the energy of the steam to mechanical action in a steam engine or turbine, and conversion of the mechanical action to electrical energy in a generator. The present invention utilizes the transformation of thermal energy to chemical energy and the transformation of chemical energy to electrical energy directly. This is much more efficient than has heretofore been possible.

The system hereof depends upon the thermal analysis of a chemical compound and the electrochemical synthesis of the same compound from the products of analysis. Hence, the chemical compound which is continuously recycled within the system acts as the vehicle by which the conversion of thermal energy to electrical energy is effected.

Figure 1:
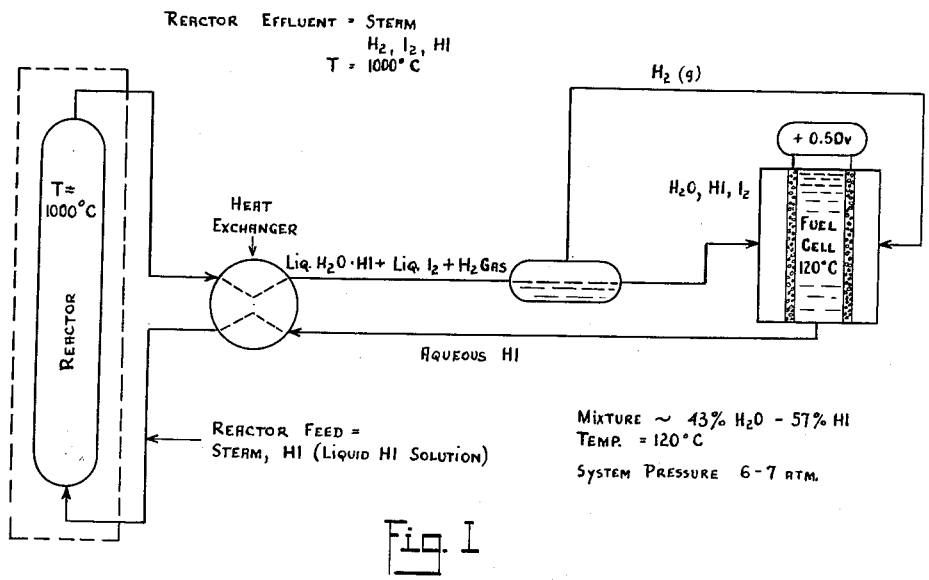
FIG. 1 is a diagrammatic illustration of an apparatus embodying the system of the present invention.

Briefly stated, this invention is a system for converting thermal energy to electrical energy having suitable apparatus for endothermically decomposing a chemical compound into materials which, under proper conditions, can be reunited to form the original compound. There is also provided apparatus for separating these decomposition products from one another. After separation, these decomposition products are introduced into a fuel cell where, as the fuel and the antifuel therefor, they are electrochemically reunited to produce electrical energy and reform the original chemical compound. This reaction product of the fuel cell is then recycled to the decomposing apparatus.

It has been further found that the substantial quantities of material utilized in such system, may be greatly lessened by cycling through the system with the thermally decomposible material, a relatively thermally stable medium in which the decomposible material is soluble and will ionize, e.g. water. Recycling of the aqueous medium also facilitates recovery of heat used in effecting thermal decomposition.

As indicated above, there are basically two principal parts of the novel systems hereof, i.e. a thermal decomposer, and a fuel cell; and for efficient operation there is included a heat exchanger to recover nearly all the heat introduced into the thermal decomposer to preheat the solution returned from the fuel cell. In these apparatus, the essential stages occur; i.e. an endothermic decomposition stage and an electrogenerative recombination stage. Any apparatus for application of a sufficient amount of heat to at least partially decompose the chemical compound may be used. Thus, the heat source may be any of those currently employed including convention combustion, i.e. gas, oil, coal, etc., by heat otherwise wasted from various processes, by solar heat, by thermal output of nuclear installations, plasma guns, etc. The apparatus for transferring heat from such sources to the decomposible material is well known and may be as simple as the "hot tube" familiar to all chemists, in which the heat source, usually electric, surrounds an elongated tube or tube coil and the material being heated is pumped through.

In inducing decomposition of various chemical compounds, while some decompose easily with heat, it is sometimes desirable to employ a catalytic material to aid in the desired decomposition. The specific nature of any catalyst which is employed will vary depending upon the particular decomposition reaction being carried out. In the embodiment shown in FIG. 1, a suitable catalyst is an unsupported platinum gauze, or platinum or some other noble metal supported on alumina, silica, silica-alumina, magnesia, or natural clay supports. Decomposition is usually not 100%, the substance being driven to an equilibrium relationship with its decomposition products. For example, hydrogen iodide yields an equilibrium in the reactor which is expressed by the equation:

$$2HI \rightleftharpoons H_2 + I_2$$

This equilibrium is advantageous in that the undecomposed material serves an important function in the recombination reaction as will be later explained. The degree of decomposition is, therefore, desirably kept below 100%.

Essentially, then, insofar as the first stage of the system is concerned, the particular form of the apparatus is unimportant so long as heat sufficient to decompose a chemical compound of a certain class is supplied to that compound and the decomposition products are not lost in the process. Catalytic means may be provided in this stage, if desired, to enhance or initiate, or both, the decomposition reaction. As indicated above heat exchanger means are supplied in the preferred embodiment to recover the reactor heat for preheating the feed stock to the reactor.

The second stage is a fuel cell which is a device or apparatus for converting chemical energy directly into electrical energy. Direct conversion of chemical energy into electrical energy is accomplished by causing a chemical reaction to take place between reactive materials at the junctures between spaced electronic conductors and an intermediately disposed ion containing and conducting medium. The reactive materials are separately applied to each juncture so that the charge exchange of the reaction takes place ionically through the ion conductor forming an internal circuit and electronically through the electron conductor forming an external circuit. Thus, where the reactive materials are continuously supplied and an electrical load is coupled to the external circuit, it is possible to convert continuously the energy of chemical reaction directly into electrical energy in the external circuit.

By way of example, where hydrogen is employed as one of the materials and iodine as the other, the oxidation of the former and reduction of the latter at the corresponding juncture between the electronic and ionic conductors generates electrical energy in the external circuit and produces hydrogen iodide as a product of the reaction or fuel cell reaction product. When each of the materials is continuously supplied and consumed within such an apparatus, it may be likened, respectively, to a fuel and to an antifuel, the former of which yields up electrons in its chemical reaction, and the latter of which takes up or accepts electrons in its chemical reaction.

The fuel and antifuel are supplied to such apparatus in a relatively stable condition, and some means is required for activating their conversion from the normally stable reactant state to a reaction product state, i.e., to cause the electrochemical reaction to take place. It is believed that such conversion of the fuel and antifuel takes place by means of chemical adsorption to a chemisorbed state and desorption to the reaction product state at the corresponding junctures between the electronic and ionic conductors. Such conversion of the fuel and antifuel is not practically self motivating and is, therefore, preferably activated by the introduction or provision at each juncture of such means which will promote such conversion. The reaction products may be removed from the apapratus in any convenient manner and preferably as they are formed.

For the purpose of this description, the apparatus for accomplishing the direct conversion of chemical energy to electrical energy will be identified as a fuel cell. The electronic conductors will be identified as electrodes, and more specifically as the anode and cathode respectively, depending upon whether they are on the fuel or antifuel side of the cell. The fuel will be regarded throughout as the substance which is oxidizable relative to the antifuel which in turn will be regarded as the substance which is reducible relative to the fuel; where oxidation and reduction, respectively contemplate the release and acceptance of electrons. The ion conductor will be identified throughout as any medium which is capable of conducting an electrical charge associated with an atom, or a group of atoms, i.e. an ion, and which, therefore, electronically isolates the electronic conductors from each other in the internal circuit. The junctures between the electrodes and the ion conductor will be identified throughout as interfaces. The activating means for promoting the conversion of the fuel and antifuel from their respective reactant state through the chemisorbed state to the reaction product state will be more specifically identified in conjunction with its functional coaction in the cell as an adsorber and a desorber. This overall reaction will be referred to as an electrochemical reaction.

Referring now more particularly to the annexed drawings, stage one is shown diagrammatically as a thermal reactor in which a decomposible electrochemical reactant compound is thermally cracked or split into materials which become the fuel and antifuel respectively, of a fuel cell. An electrically heated tube is illustrated, it being understood that any type of thermal reactor, including a thermonuclear reactor, solar reactor, simple boiler, etc. may be used. With an electrochemical reaction product such as a hydrogen halide, e.g. hydrogen iodide, a temperature of decomposition equilibrium is conveniently between 900° C. and 1100° C. For efficient operation the effluent of the thermal reactor is passed through a heat exchanger to preheat incoming electrochemical reaction product and cool the decomposition products. The admixture of hydrogen and halide, for example, is then passed through suitable apparatus for separating the hydrogen from the halogen prior to entry to the second stage, the fuel cell.

Hydrogen, separated from the halogen, iodine, for example, becomes the fuel of the fuel cell, diagrammatically shown in FIG. 1, and the halogen becomes the antifuel. The reuniting of the halogen with the hydrogen in the environment of the fuel cell produces a voltage, and the reformed hydrogen halide is recycled through the heat exchanger into the thermal reactor.

In the specific example illustrated in FIG. 1, a preferred embodiment is shown wherein the hydrogen iodide charged to the thermal reactor has water in association with it, i.e. in the form of steam. At the temperature indicated in the illustration, 1000° C., hydrogen iodide is partially decomposed to hydrogen gas, iodine, hydrogen iodide and steam. The hydrogen iodide may be partially hydrated. As this gaseous effluent passes through the heat exchanger, the water, hydrated hydrogen iodide, and iodine condense and thus spontaneously separate from the hydrogen gas. From the top of any suitable vessel, the hydrogen gas may be fed to the fuel cell as the fuel reactant. The liquid iodine solution in aqueous hydrogen iodide is fed into the cell at the interface of the cathode and the ion-containing and conducting medium, which is an aqueous hydrogen iodide solution. The cathode is desirably a porous graphite having a noble metal deposited on the interfacial surface thereof to serve as an activator to enhance the step of adsorption to the chemisorbed state of the antifuel. On the fuel side a similar porous graphite anode may be supplied having a noble metal, such as platinum, deposited thereon to enhance or activate the adsorption of the fuel, hydrogen. Desorption upon reaction is believed to be enhanced by the presence of ions in solution in the ion conducting medium. It is convenient in this case to utilize aqueous hydrogen iodide as the ionized ingredient since this is the whole material which can be recycled through the system. It provides the activator for promoting the chemical reaction. By recycling the aqueous system in the manner aforesaid, very much reduced volumes of material are handled than are otherwise required. The utilization of a recycling aqueous medium throughout the system also confers the advantages of making possible the recovery of most of the heat that has been put into the reactor by means of the heat exchanger, and the obtaining of improved voltage in the fuel cell.

Instead of supplying the ion containing and conducting medium in conjunction with either or both of the fuel and antifuel, this part of the fuel cell may be independently supplied and maintained. Means must then be supplied for separating the reaction product from the medium for recycling back to the thermal reactor. Integration of the ion containing and conducting medium with the antifuel in this case with which it is compatible avoids these problems and provides other advantages herein mentioned. Separation of hydrogen iodide from water is very difficult because a constant boiling mixture is formed. The fact that iodine is recycled in solution in aqueous HI makes it unnecessary to make this separation.

Figure 2:
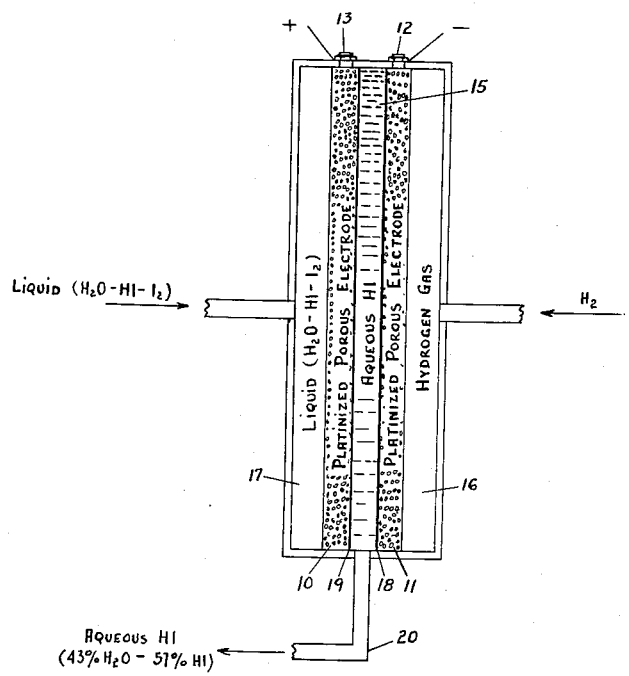
FIG. 2 is a partial sectional view of a fuel cell of the type which is useful in converting the chemical energy of recombination of thermally disassociated elements to electrical energy directly.

FIG. 2 illustrates a fuel cell structure which may be utilized in the system of the present invention. It should be understood that the device shown is merely illustrative and that any fuel cell structure may be employed. In FIG. 2 there is shown one form of fuel cell having a pair electrodes, a cathode 10 and an anode 11. Platinized porous material, e.g. graphite, Alundum, alumina, etc. may be used for each electrode. Electrodes 10 and 11 are spaced apart and electronically insulated from each other in the internal circuit. Suitable electrical connectors 12, 13 for attaching to the external circuit or load are provided. Intermediate the electrodes is an ion containing and conducting medium 15, such as an aqueous solution of hydrogen halide, i.e. HI, HBr, or HCl. While HF could be used, its physical handling poses problems of more difficult degree than any of the other hydrogen halides. Chambers 16 and 17 are provided external of the electrode interfaces to receive the fuel and antifuel, respectively, and contact them with the external surface of anode 11 and cathode 10, respectively. Because of the porous nature of the electrodes 10 and 11 and a pressure differential across the electrode, fuel and antifuel are conducted to the interfaces 18 and 19, respectively, where the desired electrochemical reaction takes place. Where aqueous hydrogen halide is continuously provided as shown in FIG. 2, and passed through the porous electrode 10 to supply fresh ion containing and conducting medium 15, the latter must be continuously removed. Thus, suitable outlet means 20 are provided for exiting the medium 15 and exhausting the product of fuel cell reaction, reformed hydrogen halide. It should be pointed out that the heat of solution of hydrogen iodide is equivalent to 0.2 volts at the time of formation of HI which raises the potential to about 0.5 volts and favors the inclusion of water within the system.

As a representative example of a preferred vehicle, a 43% water, 57% hydrogen iodide solution may be used. With such a circulating vehicle, a maximum voltage of 0.50 v. (open circuit) at a current density of as high as 100 amps./sq. ft., and a power output of 1 to 3 H.P./cu. ft. at 75% thermal efficiency obtainable.

There has thus been provided an energy conversion system in which a chemical compound is chemically analyzed by thermal decomposition into materials which can be utilized as the fuel and antifuel respectively in a fuel cell where they are electrochemically synthesized to produce electrical energy by reformation of the compound which may then be recycled through the system. The system utilizing an aqueous hydrogen halide feed stock to the thermal reactor and recycling the water between the reactor and the fuel cell has advantages resulting in increased efficiency not heretofore attainable with other energy conversion systems.

Other modes of applying the principle of this invention may be employed instead of those specifically set forth above, changes being made as regards the details herein disclosed, provided the elements set forth in any of the following claims, or the equivalent of such, be employed.

It is, therefore, particularly pointed out and distinctly claimed as the invention:

1. In a closed system for converting thermal energy to electrical energy, the combination comprising, a predetermined amount of a solution of hydrogen halide and water in said system, means coacting in said system to endothermically partially decompose said hydrogen halide in the presence of water into hydrogen, halogen and steam and undecomposed hydrogen halide, means for liquefying the halogen, steam and hydrogen halide to form an aqueous solution thereof, means independently coacting in said system to physically separate the hydrogen from the halogen in the presence of water, a fuel cell including spaced electrodes and means for supplying and maintaining a predetermined amount of the solution of water and hydrogen halide in the space between the electrodes, means for supplying the separated hydrogen to the interface at one electrode and means for independently supplying the separated halogen in aqueous solution with undecomposed hydrogen halide to the interface at the other electrode, said fuel cell coacting in the system to generate electrical energy by electrochemically recombining the hydrogen and the halogen into said solution of hydrogen halide and water, and means for recycling said solution of hydrogen halide and water to said decomposing means.

2. In a closed system for converting thermal energy to electrical energy, the combination comprising a predetermined amount of a solution of hydrogen halide and water in said system, means coacting in said system to endothermically partially decompose said hydrogen halide in the presence of water into hydrogen, halogen and steam, and undecomposed hydrogen halide, heat exchanger means coacting with said decomposing means to conserve heat supplied to said decomposing means, means independently coacting in said system to physically separate the hydrogen from the halogen and the presence of water, a fuel cell including spaced electrodes and means for supplying and maintaining a predetermined amount of the solution of water and hydrogen halide in the space between the electrodes, means for supplying the separated hydrogen to the interface at one electrode and means for independently applying the separated halogen in aqueous solution with undecomposed hydrogen halide to the interface at the other electrode, said fuel cell coacting in the system to generate electrical energy by electrochemically recombining the hydrogen and the halogen into said solution of hydrogen halide and water, and means for recycling said solution of halide and water through said heat exchanger means to said decomposing means.

3. A system in accordance with claim 1 in which the hydrogen halide is hydrogen iodide.

4. A system in accordance with claim 1 in which the hydrogen halide is hydrogen bromide.

References Cited in the file of this patent

UNITED STATES PATENTS

| | | |
|---|---|---|
| 2,901,524 | Gorin et al. | Aug. 25, 1959 |
| 2,921,110 | Crowley et al. | Jan. 12, 1960 |

OTHER REFERENCES

Proceedings Thirteenth Annual Power Sources Conferences (of record), pages 18–60.

Proceedings Thirteenth Annual Power Sources Conferences 28–30, April 1959, Fort Monmouth, N.J., pages 122–124.